United States Patent
Rast (10) Patent No.: US 6,241,527 B1
(45) Date of Patent: Jun. 5, 2001

(54) INTERACTIVE EDUCATIONAL DISPLAY BOARD

(75) Inventor: Rodger Hugo Rast, Gold River, CA (US)

(73) Assignee: Rastar Corporation, Gold River, CA (US)

( * ) Notice: Subject to any disclaimer, the term of this patent is extended or adjusted under 35 U.S.C. 154(b) by 0 days.

(21) Appl. No.: 09/100,374

(22) Filed: Jun. 19, 1998

(51) Int. Cl.[7] ............................. G09B 7/00; G09B 7/06
(52) U.S. Cl. ......................... 434/327; 434/339; 345/156
(58) Field of Search .................. 434/327, 339, 434/224, 219, 322, 307 R, 362, 308, 323, 365; 345/146, 156, 173, 176, 473, 87; 40/427, 435, 543, 544, 617; 178/18.01

(56) References Cited

U.S. PATENT DOCUMENTS

| | | | |
|---|---|---|---|
| 3,696,525 | * 10/1972 | Cleary | 434/339 X |
| 3,704,337 | * 11/1972 | Sims, Jr. et al. | 434/339 X |
| 3,955,290 | 5/1976 | Filer . | |
| 4,228,597 | 10/1980 | Albenda . | |
| 4,425,099 | * 1/1984 | Naden | 434/339 X |
| 4,432,733 | * 2/1984 | Carlson | 434/339 |
| 4,522,599 | * 6/1985 | Harte | 434/339 |
| 4,561,852 | 12/1985 | Harte . | |
| 4,664,634 | * 5/1987 | Cutler et al. | 434/339 X |
| 4,854,879 | * 8/1989 | Chang | 434/339 |
| 5,010,463 | 4/1991 | Ross . | |
| 5,632,679 | * 5/1997 | Tremmel | 463/36 X |
| 5,880,411 | * 3/1999 | Gillespie et al. | 178/18.01 |
| 5,903,254 | * 5/1999 | Mundt et al. | 345/146 X |
| 5,982,352 | * 11/1999 | Pryor | 345/156 X |
| 6,023,265 | * 2/2000 | Lee | 345/173 X |
| 6,028,271 | * 2/2000 | Gillespie et al. | 178/18.01 X |
| 6,040,824 | * 3/2000 | Maekawa et al. | 345/173 X |

* cited by examiner

Primary Examiner—Michael O'Neill
Assistant Examiner—Chanda Harris
(74) Attorney, Agent, or Firm—Rodger H. Rast (57) ABSTRACT

Educational display boards are in widespread use—from classrooms to boardrooms. A display board is a thin substantially planar material imprinted with graphics and text that often conveys a relationship between elements. The present invention is specifically a design for interactive educational display boards upon which users interact by touching one contact associated with a term corresponding to a question, and one or more terms corresponding to an answer selection. User bodily resistance is sensed by the circuit as user input; to which the interactive display board responds with a variety of audio tunes and tones in relation to these user choices.

20 Claims, 9 Drawing Sheets

INTERACTIVE EDUCATIONAL DISPLAY BOARD

CROSS REFERENCE TO RELATED APPLICATIONS

Not Applicable

STATEMENT REGARDING FEDERALLY SPONSORED R&D

Not Applicable

REFERENCE TO A MICROFICHE APPENDIX

Not Applicable

BACKGROUND OF THE INVENTION

Field of Invention

The present invention is associated with electronic teaching aids; specifically an electronically augmented display board that is user-interactive.

Educational display boards in current use generally exist as non-interactive pictorials hanging on classroom walls. These display boards are thin inexpensive cardboard or plastic sheets imprinted with graphics and text depicting relational information, yet they provide no mechanism to foster the process of learning.

BRIEF SUMMARY OF THE INVENTION

An interactive electronic display board containing text and/or graphics wherein a hidden conductive matrix connects user input contacts located on the facing surface of the display board with a battery powered electronic module that generates audio response outputs based on the interpretation of answer input connections that are created by sensing a user's body resistance when contact is made across a pair of electrical sense contacts.

BRIEF DESCRIPTION OF THE SEVERAL VIEWS OF THE INVENTION

FIG. 2-A is a facing view of the display board with attached electronics

FIG. 2-B is an expanded facing view of the electronics module of the interactive display board FIG. 3-A is a top perspective view of the electronics module from the interactive display board FIG. 3-B is a bottom perspective view of the electronics module FIG. 4-A is a top perspective view of an alternate embodiment of the electronics module FIG. 4-B is a bottom perspective view of an alternate embodiment of the electronics module FIG. 5-A is a facing view of the interactive display board without electronics module FIG. 5-B is a back-side view of the interactive display board without electronics module FIG. 6-A is a facing view of the interactive display board with electronics module FIG. 6-B is a back-side view of the interactive display board with electronics module

REFERENCE NUMERALS USED IN DRAWINGS

Figure 2:
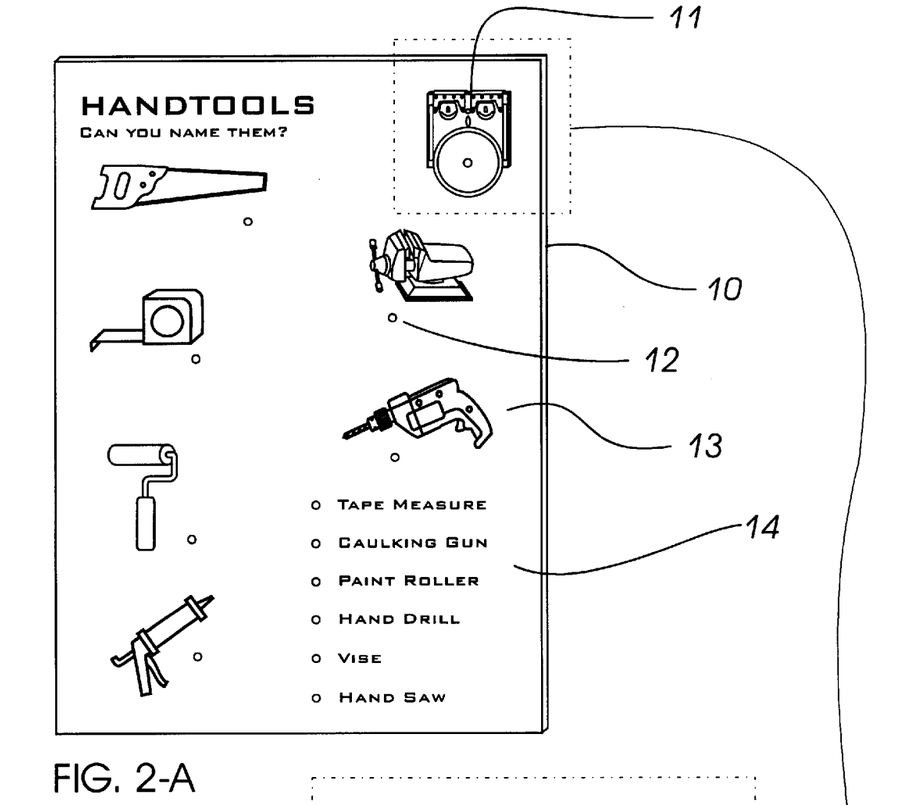
Figure 3:
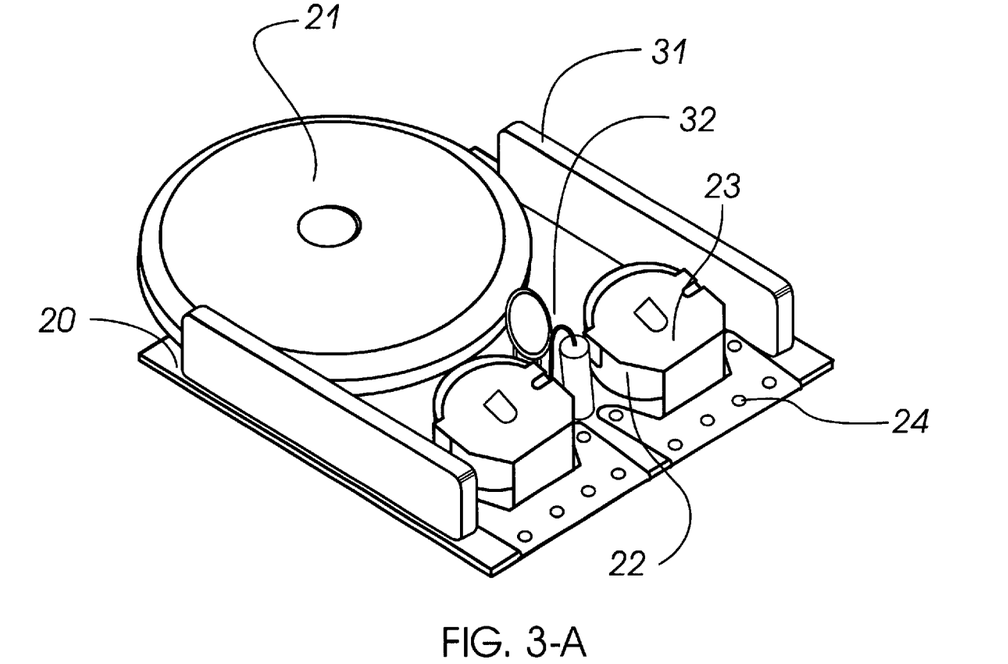
Figure 4:
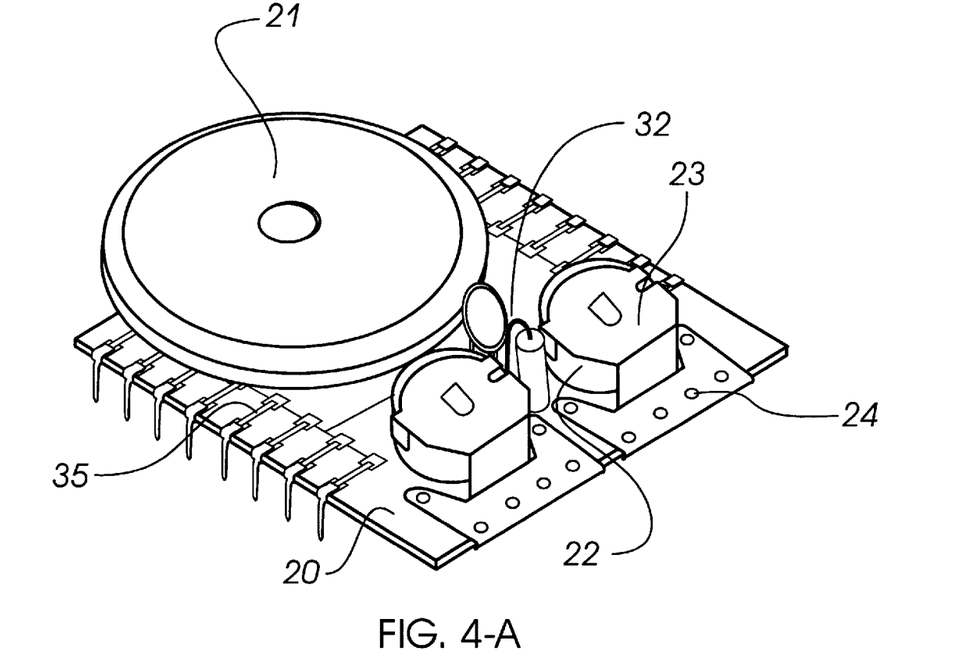
Figure 5:
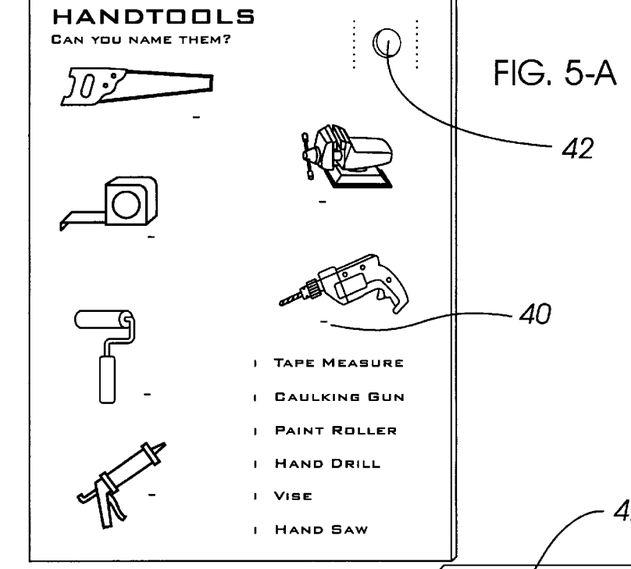
Figure 6:
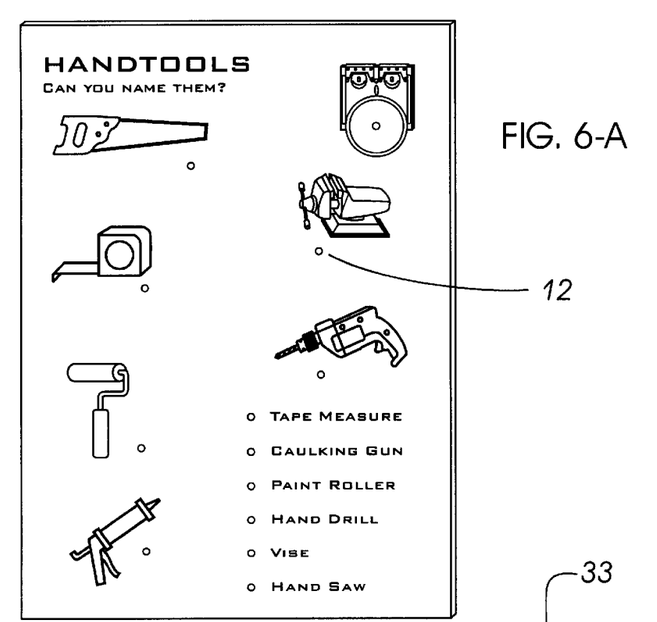
Figure 7:
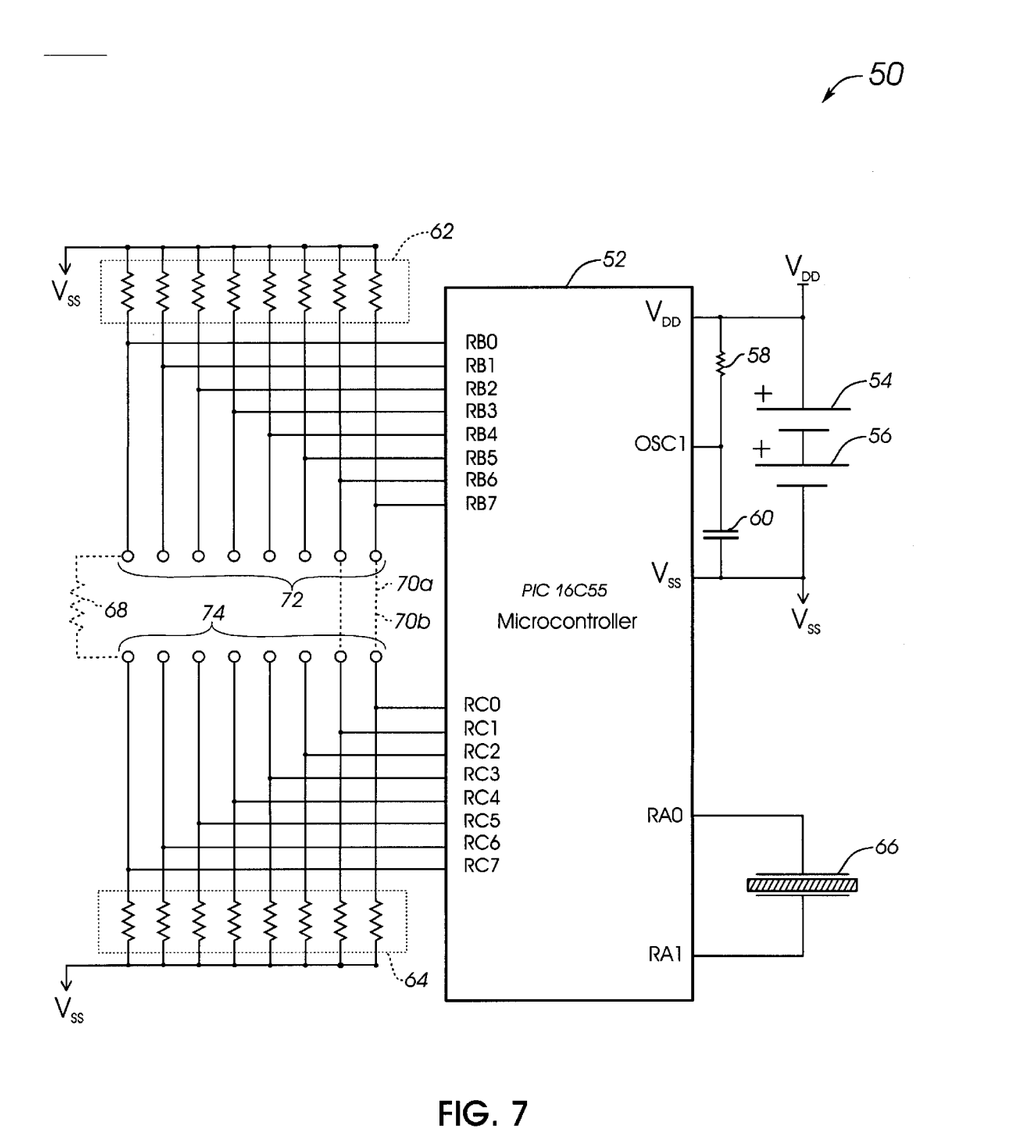
FIG. 7 is a schematic diagram of the electronics module

In FIG. 2-A, Interactive Display Board showing Electronics Module:
10 Printed display board
11 Interactive display electronic module
12 Answer connection contact
13 Printed graphics symbols
14 Printed text In FIG. 2-B, Facing View of Interactive Display Board:
11 Interactive display electronic module In FIG. 3-A, Top Perspective View of Electronics Module from Interactive Display Board:
20 Printed circuit board
21 Piezo-electric audio transducer
22 Battery cell
23 Sheet metal battery retainer
24 Sheet metal inverted dimple
31 SIP resistor network
32 Through-hole discretes In FIG. 3-B, Bottom Perspective View of Electronics Module from Interactive Display Board:
20 Printed circuit board
21 Piezo-electric audio transducer
23 Sheet metal battery retainer
24 Sheet metal inverted dimple
30 Electronic control circuit
33 Electrical connection pin
34 Battery feedthrough connection In FIG. 4-A, Top Perspective View, Alternate Embodiment of Electronics Module:
20 Printed circuit board
21 Piezo-electric audio transducer
22 Battery cell
23 Sheet metal battery retainer
24 Sheet metal inverted dimple
32 Through-hole discretes
35 Painted-on Resistors In FIG. 4-B, Bottom Perspective View, Alternate Embodiment of Electronics Module:
20 Printed circuit board
21 Piezo-electric audio transducer
23 Sheet metal battery retainer
24 Sheet metal inverted dimple
30 Electronic control circuit
33 Electrical connection pin
34 Battery feedthrough connection In FIG. 5-A, Front View of Interactive Display Board without Electronics Module:
40 Contact hole cutouts
42 IC cutout In FIG. 5-B, Back View of Interactive Display Board without Electronics Module:
40 Hole cutouts in display board
41 Conductive paint traces
42 IC cutout In FIG. 6-A, Front View of Interactive Display Board with Electronics Module:
12 Answer connection contact In FIG. 6-B, Back View of Interactive Display Board with Electronics Module:
12 Answer connection contact
33 Electrical connection pin 41 Conductive paint traces In FIG. 7, Schematic of Electronics Module:

50 Electronics
52 Microcontroller
54 battery
56 battery
58 resistor
60 capacitor
62 resistors
64 resistors
66 piezo-electric
68 applied resistance
70a unused sense line
70b unused sense line
72 first set of sense contacts
74 second set of sense contaacts

DETAILED DESCRIPTION OF THE INVENTION

Description of Prior Art

Presently display boards are used in instances from classrooms to boardrooms. A display board is a thin substantially planar material, often cardboard, imprinted with graphics and text. Display boards to date are hanging non-interactive pictorials, fastened to walls by means of staples, tacks, tapes or glues. Display boards fall into three main categories: decorative, directive, and educational. The latter category of educational display boards contain information of either a graphical or text nature for which names, symbols or relationships between elements are to be learned. Often the information is of a matching variety; whereby a picture is matched with its name; such as would exist in the case of a display board containing a picture of a sailing ship in which lines go out to labels for each associated part of the ship. Educational display boards of this nature are used extensively in classrooms. Display boards in current usage remain non-interactive; they may only be viewed—no feedback is provided. Providing display boards that are interactive with a sufficient level of feedback, increases learned retention of the contained material while increasing the enjoyment of the learning process. Commercializing interactive educational display boards requires a design that is extremely cost effective, provides a high level of feedback, can be scaled to any size, can be powered for months from a small battery, while being both simple and obvious to use. When considering this interactive display board application, the prior art has numerous shortcomings.

In U.S. Pat. No. 3,955,290 of 1976 the learning device of Armond Filer provides visual feedback in the form of a green or red light corresponding to right and wrong matches between contact receptacles. In selecting the matching pair the user is required to insert plugs with attached wiring into the receptacles corresponding to the match choices and then is required to press a button prior to the circuits' response of either a red or green light. The circuit does not detect when the user has made a choice and it requires the use of two patch-cords connected to a source of electrical ground. These patch cords must be inserted into sockets or a connector which will leave the user with a hand free in order to press the "answer display" button. The sockets for insertion of these patch-cords requires mounting on a backing medium that is substantial thicker than current display boards. Providing lights of sufficient intensity to be seen in daylight requires considerable power which precludes small battery cells as a power source. The circuit can not keep track of the historical selections made and therefore is unable to provide varying feedback based on a progression of correct answers. Additionally the overall simplicity of the feedback—a mere pair of lights, either on or off—lacks the excitement to entice use of the device.

In U.S. Pat. No. 4,561,852 of Dec. 31, 1985, Harte uses a sandwiched matrix of electro-resistive sheets and non-conductive response hole-pattern sheets as input device to a computer. Pressing user response locations on the top sheet causes a connection between layers and thereby a particular set of resistive values to be interpreted by a computer and its associated hardware and software, relative to the question sheet in use. This mechanism is not suitable for creating interactive display boards as the sandwich matrix is costly and bulky when used in a large area such as a display board. Additionally a separate processor is required that makes all decisions and provides all user feedback.

In U.S. Pat. No. 5,010,463 of Apr. 23, 1991, the push-pin bulletin board of Ross comprises a sandwich of conductive and non-conductive materials in which a lamp or LED assembly with two extended conductive pins are inserted into the matrix. When the illuminable push-pin is inserted in an area of the correct answer it lights to indicate a correct response. Using this design for interactive display boards would pose a number of problems. The material matrix is substantially thick for pin insertion, making the boards impossible to roll and difficult to mount on a wall. These push pins are small separate devices whose leads can be damaged by being bent and that may themselves be lost. In addition, each time the illuminable push-pin is inserted a new set of holes is made in the material of the facing layer; this not only destroys the facing layer with use, but the increased hole concentration in proximity of the correct answer provide an unfair clue.

Teaching devices currently on the market and prior art patents do not provide a suitable design for creating interactive display boards that are thin, easily manufactured, cost effective, and that provide a level of audio user feedback that stimulates use of this new learning aid.

Objects and Advantages

It is foremost an object of the present invention to provide a thin interactive display board over which has been printed graphics and/or text and which further contains substantially flush mounted touchable contacts on the front of the graphics that are connected via conductive pathways to an electronic module containing the logic, power, and audio circuitry. Resultant display boards would be conventionally manufactured in dimensions generally larger than a notebook, and could well be manufactured of dimensions to span the circumference of a room. In use these interactive display boards would usually be mounted vertically on walls, although other mounting locations; such as table tops, floors and ceilings would serve additional applications. The present invention further proceeds with additional objects and advantages. Specifically the objects of this invention are:

(a) to provide a low-cost interactive teaching aid;

(b) to provide an interactive electronic display board that can be easily manufactured;

(c) to provide an interactive electronic display board that allows ready conversion of existing display board materials and themes into interactive display boards;

(c) to provide an interactive electronic display board that is not prone to contact wear, or destruction of the facing material;

(d) to provide an interactive electronic display board in which answers are selected by a user physically contacting conductive areas on the facing material which thereby does not require additional equipment, such as pins or wiring for answer selections to be made;

(e) to provide an interactive electronic display board design that can be inexpensively fabricated into display boards of various sizes and shapes;

(f) to provide an interactive electronic display board whose audio feedback is of a complex nature incorporating various tunes and tones so as to increase the perceived element of enjoyment for the display board users;

(g) to provide an interactive electronic display board that keeps track of a user's right and wrong answers so that increasing levels of positive or negative feedback can be generated in response;

(h) to provide an interactive electronic display board that upon a user correctly answering all questions in a certain amount of time rewards the user with a tune or tone sequence associated with winning;

(i) to provide an interactive electronic display board whose electronics and audio generation mechanism do not require a housing independent of the display board;

(j) to provide an interactive electronic display board whose audio outputs can be programmed to provide tunes and tones in accordance with the nature of the display. i.e. ship sounds on a display board of the parts of a ship;

(k) to provide an electronic display board that operates continuously and for which there is no need of a power switch;

(l) to provide an electronic display board that can operate for a number of months on a single battery, or set or batteries, that upon depletion can subsequently be user replaced;

Still further objects and advantages will become apparent from a consideration of the ensuing description and drawings.

Description of the Preferred Embodiment

Figure 1:
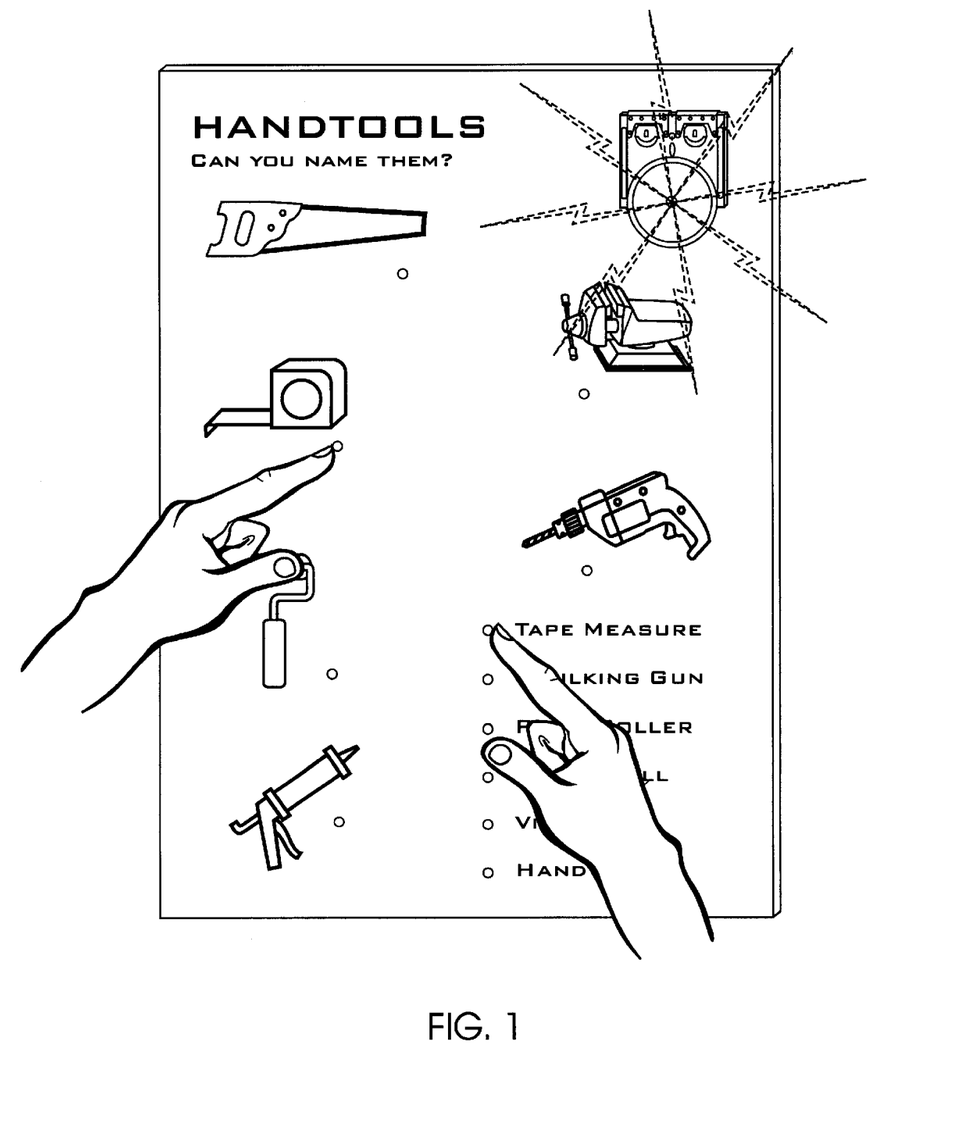
FIG. 1 is a facing view of the interactive display board in use

Describing the device requires a description of the mechanical parts, and the electronic parts. (Being of a process nature—the firmware is detailed under operation.) Mechanical Description:

The large perspective front view of FIG. 1 shows the interactive electronic display board in use emitting an audio tone and the relationship between the mechanical elements.

Depicting a facing view of the preferred embodiment of the display board with attached electronics module is FIG. 2-A. An expanded facing view of the electronics module is shown in FIG. 2-B. The display board of FIG. 2-A at first glance is similar to display boards currently in widespread classroom use; a rigid or semi-rigid backing 10 contains graphic elements 13 and textual information 14. However as shown in the preferred embodiment of FIG. 2-A are the additional elements of an electronics module 11 shown fastened to the front of the display board 10, one of the user selectable answer connection contacts is also shown 12.

An enlarged view of the electronics module of 11 is contained in FIG. 2-B.

A perspective view of the electronics module shown separated from the display board is depicted in a perspective topside view in FIG. 3-A and as an underside perspective view in FIG. 3-B. It will be appreciated that the following provides implementation examples for the present invention, however, the physical construction is subject to variation without departing from the teachings of the present invention. This module contains a printed circuit board (PC board) 20 composed of 0.32" phenolic with ½ ounce copper, that has been etched; thereby leaving circuit traces which are then electroplated with nickel for corrosion resistance.

A piezo-electric audio transducer 21 is soldered to the printed circuit board. This piezo-electric form of audio device requires a 2–5 kHz AC signal to drive it. Piezo-electric audio transducers are low cost, small in size and they have a high decibel audio output level with low current requirements.

A pair of batteries 22 is in electrical connection with the underlying circuit elements. The sides and top of these button-cell batteries form the negative polarity contact while a round protrusion from the underside forms the positive battery terminal.

A pair of battery holders 23 contact the negative polarity of the batteries and provide mechanical retention. These holders are formed from thin sheet metal stamped from sections of thin corrosion resistant metal such as tinned spring-steel. After the metal sections are cut to shape, a "U-shaped" horizontal slot is formed to which the printed circuit board will later be inserted. A number of small inverted dome shaped contact dots 24 are press-formed at intervals on the metal sections that will be in contact with the PC board to assure both electrical connection with the underlying printed circuit traces and mechanical retention when the PC board is inserted in the channel. The metal leading away from this channel lies flush with the PC board surface for a distance of 80 mils, which is then bent to a vertical 90 degree bend parallel to the plane of the mounting channel that contacts the rearward vertical face of the cylindrical button-cell battery, it then bends 90 degrees back parallel to the PC board surface to enclose the top the battery, on each side of this top flat section are found downward 90 degree bends of small tabs that form retaining structures preventing sideways displacement of the batteries. Making contact with the positive polarity of the battery is a 24 gauge solid bare wire that has been soldered like a jumper under the cells positive terminal which is then fed through to the other side of the PC board to the electronics.

A pair of single in-line (SIP) resistor networks are depicted at the sides of the electronics module 31. Each resistor network contains 8 resistors commonly pulling to ground.

A pair of through hole discrete components 32, specifically a resistor and capacitor, are also shown in FIG. 3-A.

The backside of this electronics module is shown in FIG. 3-B. The electronic control circuit 30 in this preferred reduction to practice comprises a microcontroller chip as a small silicon "die" attached to the printed circuit board with epoxy and then wires are connected directly from the die to the traces of the printed circuit board and then the die and leads are covered with resin. The resultant resin dome containing the control electronics in this preferred embodiment is approximately ⅜ inch diameter, rising 1/16 inch high. This form of assembly is a common practice in the electronic toy industry. The microcontroller is either factory programmed, or masked programmed for the specific display board or provided with general purpose sound effects for a wide variety of display board graphic themes. A microcontroller containing one time programmable (OTP) memory or another form of static program memory allows programming of the microcontroller with sounds and functions specific to the display theme to which it will be mounted: e.g. ship sounds on a nautical display board.

One of numerous pins for establishing electrical connection between the electronic module and the display board's conductive pathways is shown by 33. One of the two battery contact feed-through connections is depicted by the protrusion 34 of one end of a top side mounted bare jumper wire over which the button cell battery is mounted and thereupon makes electrical contact.

A perspective view of an alternate embodiment of the electronics module is depicted in a perspective topside view in FIG. 4-A and as an underside perspective view in FIG. 4-B. This embodiment shown as FIG. 4-B utilizes less expensive painted on resistors 35 instead of the SIP resistor networks. These resistors are formed on the PCB substrate by applying a layer of low conductive paint over a pair of resistor endpoint contacts. Paint-formed resistors are practical as the accuracy of the resultant resistance is of little consequence. Painting on resistors is a technique used since the 1970's on consumer devices such as calculators. FIG. 4-B depicts one electronic connection contact pin 33 this is an edge mounted connector pin that is less expensive to manufacture that a through hole mounted pin.

The display board without the electronics module or answer connection contacts is shown in front view as FIG. 5-A, and from the rear-view as FIG. 5-B. Viewing the front of the display board the appearance is that of a display poster with holes and slots cut through it, one large slot is depicted 40 for insertion of answer connection contacts, smaller slots accommodate the electrical pins protruding from the electronics module, while a large round hole 42 provides an IC cutout which provides a relief cutout so that the integrated circuit (IC) mounted on the back of the electronics module will not prevent the module from mounting flush with the surface material of the display board. Numerous conductive pathways are represented 41 in FIG. 5-B. These conductive pathways are created by screen printing a conductive paint onto the display board. Alternately these conductive pathways can be formed by means of wiring or conductive tapes. An additional layer, or layers, of material, not shown, could be placed over the conductive pathways to hide them and assure contact integrity, or sections placed as insulation to allow conductive pathways to cross over one another without making electrical connection.

Adding the electronics module and electrical connections results in FIG. 6-A as a front view and FIG. 6-B as a rear view. Brass brads, a common stationary supply item, are used for the answer connection contacts 12, in this reduction to practice. With the "legs" of these brads together, the brad is inserted through a hole or slot in the display board. Legs of the brad are then bent 90 degrees in opposite directions. The head of each brad is thereby seen 12 on the front of the interactive display board while the legs make contact on the backside of the display board as shown 12 in FIG. 6-B. In a similar manner the small pins shown extending vertically from the backside diagram of FIG. 3-B and FIG. 4-B at 33 have been inserted through the display board and bent over 33 to make contact with the conductive paint traces 41 in FIG. 6-B.

Electronic Hardware Description:

A schematic, FIG. 7, shows a preferred electronic design 50 of this interactive display board. Minimized part count is achieved in the preferred embodiment by selecting a primary circuit device capable of programmed input and output sequencing that integrates a number of functions at low cost. The primary circuit device chosen was a microcontroller 52.

A microcontroller is an integrated circuit containing a microprocessor, memory, input/output, plus auxiliary functions. The microcontroller employed in this preferred embodiment contains: program memory, data memory, an on-board oscillator driver, reset circuitry, port pins that can be set for either input or output, selectable pull-up resistors on inputs, internal sleep circuitry, a wake-up timing circuit, and a general purpose timing element. The 8-bit microcontroller chosen for the preferred embodiment is designated as a PIC 16C55 and is produced by Microchip Corporation.

Providing power to the microcontroller is a pair of button cell batteries 54, 56, that when combined in series produce a nominal 3 volts.

A resistor 58 and capacitor 60 in series form the control elements in an RC oscillator for the microcontroller. The values chosen for resistor 58 of 4.7K Ohms and capacitor 60 of 22 Pico Farad result in a microprocessor frequency of approximately 4 mHz. Microcontroller input and outputs are shown with groups of 4.7M Ohm resistors 62, 64 pulling voltages down toward Vss.

A piezo-electric audio transducer 66 is driven by two of the microprocessor's general input/output (I/O) port pins. Piezo-electric transducers operate on principles similar to quartz frequency crystals and require AC excitation that in this case is provided by programmed push-pull voltages on the microcontroller. The frequency response of a piezo device is limited in range and linearity, containing huge spikes at resonant frequencies, yet for simple tone outputs a high decibel level is produced at low current consumption.

A resistive element 68 shown in dashed lines represents the user's finger to finger resistance, which represents the resistance from one finger to a finger on the same or alternate hand of the user, or the resistance between any two uncovered portions of the human body.

Two dashed lines 70a, 70b, on FIG. 7 are labeled "represent unused lines". Since the particular display board shown uses only 6 answer pairs of the available 8 pairs 72, 74. The 2 remaining lines 70a, 70b, are shorted from out to in via the conductive traces on the back of the display material. The firmware makes allowance for the unused lines while interpreting responses.

Operation of the Preferred Embodiment

Understanding the operation of this interactive electronic display board requires understanding the mechanical operation, the electrical operation, and finally the operation of the underlying firmware.

Mechanical Operation:

In reference to FIG. 1, One hand of a user is shown touching an electrical contact, a brass brad, nearby the graphic of a tape measure, while the alternate hand of the user is touching an electrical contact associated with the text "Tape Measure". The circuit registers which contacts are being touched, interprets the response as either incorrect, correct, or a fault, compares it with recent history and present state, then produces a suitable audio response in the form of beeps, tones, or tunes. In the case shown, the user has selected a correct answer by properly matching the tape measure graphic with its name, and will be rewarded by audio feedback representing a correct answer. The exact form of audio feedback may vary depending on the user's recent answers. The preferred embodiment, for example, rewards successive correct answers with progressively more positive sounding tones, and plays a special tune sequence if all are answered correctly within a specific period of time.

A user selects a response pair by simultaneously touching the contact pair and thereby applying the resistance between the body parts touched across the resistance sensing means. The sense current amplitude is between 100 nA and 500 nA. Current activity at this low level poses no possible danger and can not even be felt by the user. Persons experience induced bodily eddy current levels higher than this merely by standing near a fluorescent lamp.

Electrical Operation:

The electrical circuitry of the interactive display board is continually in electrical connection with the source of electrical power supplied by the batteries; providing of course the batteries have been inserted in the battery holders. The internal programmed instructions, called firmware, within the microcontroller direct the various actions of this controlling element. (A description of the firmware operation is detailed later.)

Audio is generated as the microcontroller alternately sets each side of the piezo-electric transducer from hi-voltage to low-voltage in closely-timed sequences, for example to produce a basic 2 kHz square-wave tone: each side of the transducer must transition, either from low to high, or high to low, every 250 microseconds (uS).

To detect user input, the microcontroller sets one input/output pin to output a logic high state and the rest of the input/output pins as inputs. If the user is touching the pair of electrical contacts on the front of the display board that correspond to these input/output pins, then the logic high state is sensed through the body resistance of the user on an input pin. The body resistance of the user normally ranges between 1–10 M Ohms. By quickly sequencing which pin is used as output, the microcontroller can determine precisely which connections are currently being made by the user, and thereby interpret the response based on which pins are in use and recent answer selection history to thereby determine an appropriate audio response. The pull-down resistors couple with the controller chip characteristics to allow resistance values under the 10 Megaohm range to be registered as a connection. In addition, by measuring the time after the input and output pins are activated and the input capacitance charges to a logic one level, the firmware can determine the relative resistance between contacts to provide variable audio feedback based on differences in contact resistance.

The conduction pathway between an output pin to an input pin is now further described. When the user is selecting an answer on the front of the interactive display board, the conductive path between the input/output pins of the microcontroller follows this path: output pin at logic high level, about 2.7 Volts, on the microcontroller die is connected via wire lead to the phenolic printed circuit board, (this wire cannot be seen as it is encapsulated within a dome of epoxy), whose copper traces route the signal to a physical connection pin shown in FIG. 3-B as 33, this pin projects through the non-conductive display board material and is bent over 33 in FIG. 6-B, to establish electrical contact with the conductive paint traces 41 in FIG. 6-B on the back side of the display board, these conductive paint traces carry the signal up to one of the holes in the display board wherein a brad has been inserted—the legs of the brad being in electrical contact with the conductive paint, the signal thereby reaches the user and is imposed on the other hand of that user then comes back through another brad and is similarly routed back to a microcontroller input pin.

Figure 8:
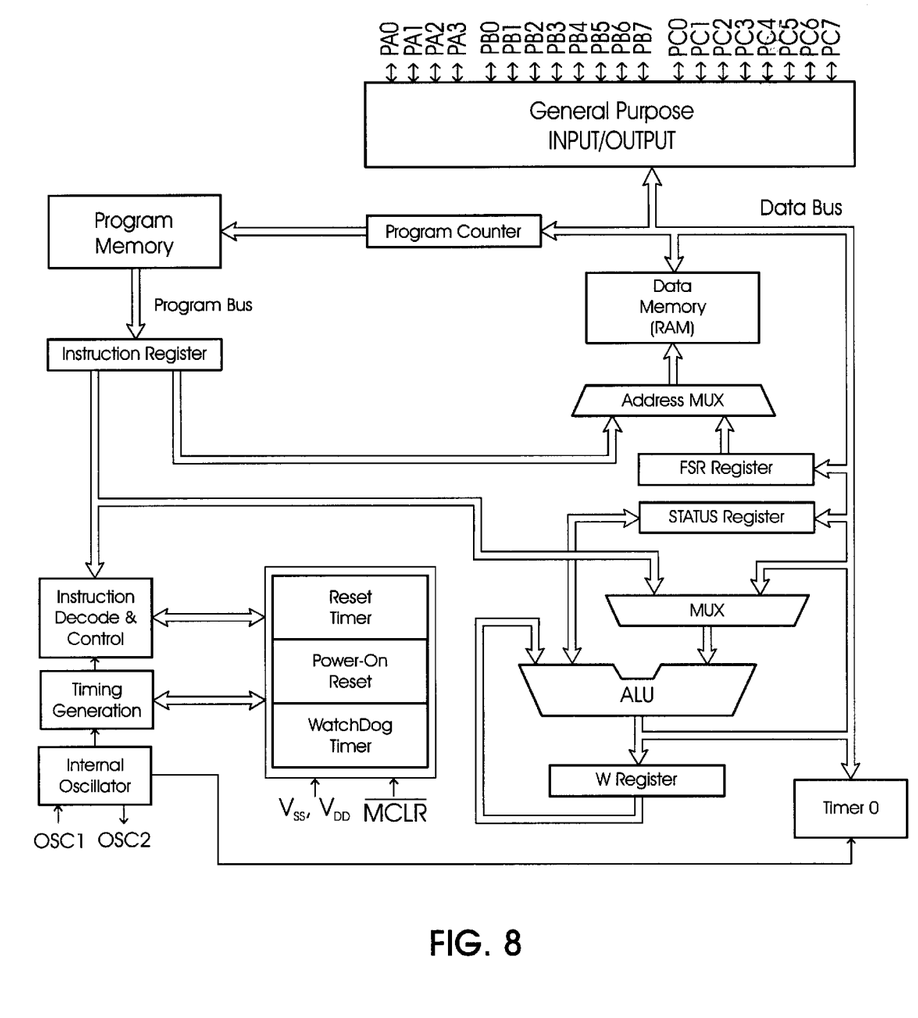
FIG. 8 shows an internal block diagram of the microcontroller used

A block diagram of the internals of the PIC 16C55 microcontroller is shown in FIG. 8 as an aid to understanding the overall system operation. Although features and structures of Microchips' PIC 16C55 are discussed, it is not to be inferred that the design requires this given microcontroller. A number of available microcontrollers can be substituted with minor circuit and/or firmware alterations.

As can be seen from the internal function block diagram in FIG. 8, the "microcontroller" has a microprocessor core that contains numerous function blocks: Data paths are indicated in the figure by pairs of lines terminated by arrows. An "ALU" (Arithmetic and Logic Unit) performs bit-wise addition, subtraction, and logic operations. A "W" register for receiving the ALU output or as ALU input. A multiplex input "MUX" to the ALU allows selection of ALU input terms. A "status" register holds ALU operation flags such as overflow "OVF" or carry, A "Data Memory" store in random access memory "RAM" holds program variables. An address multiplexor "Address MUX" selects either direct addressing or relative addressing via the file select register "FSR" register. A "Program Memory" area contains the programmed instructions. A "Program Counter" register selects addresses within the program memory whose program data is loaded into an "Instruction Register". Portions of the contents of the instruction register are fed to both the "Instruction Decode and Control" register for interpreting the instruction, and the "address MUX" which addresses locations in the data memory.

In addition to these microprocessor functions, this microcontroller contains: "General Purpose INPUT/OUTPUT" registers that read digital inputs and set digital outputs. A "WatchDog Timer" circuit interrupts errant program operation and wakes the processor from sleep mode. A "Reset Timer" controls holding the processor in reset while the oscillator circuit stabilizes. A "Power-On Reset" circuitry controls resetting of the processor when power is applied or restored. "Timer O" is a multipurpose timing element under program control, it keeps track of time intervals independently of programmed timing loops. An "Internal Oscillator Driver" provides a clock generation signal that uses the series resistor and capacitor as a time setting element that provides the microcontroller timebase. Same or similar functions to these are provided by numerous other microcontrollers on the market.

Figure 9:
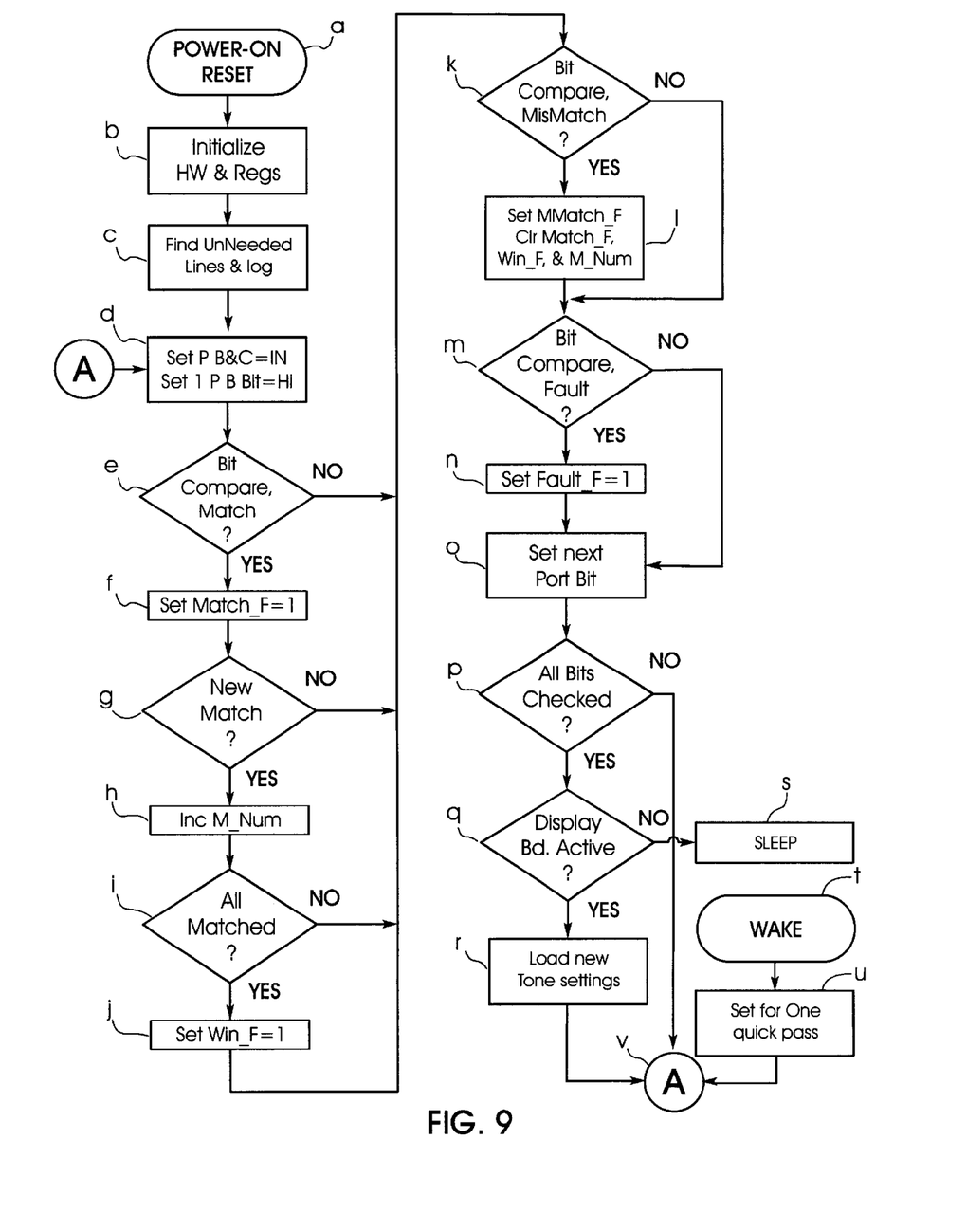
FIG. 9 is a flowchart of the microcontroller firmware

Firmware Operation:

The system lies inactive until the button-cell batteries are inserted. Referring to FIG. 9, the microcontroller soon leaves the reset state "a" and begins program execution. The functional flow of the firmware code processed by the microcontroller is depicted in this operation flowchart.

The microcontroller comes out of "POWER-ON RESET" and begins program execution as shown by block "a" in FIG. 9. In "b" the software registers are zeroed out and hardware is initialized to a known state whereby audio is turned off, a timebase is set, and the extra input/output lines are set as inputs. In "c" a pin to pin test is performed to determine which pins are not being used. The actual interactive display board may not contain as many matching pairs as the hardware can support; therefore pin usage is mapped.

If the firmware retains a singular pin-to-pin association for matched pairs, then certain arrangements of matched pairs on an interactive display board would require crossovers of the routed conductors on the back of the display board. Obviously the firmware could be tailored to each instance of matching board; unfortunately this requires a separate set of firmware to be written for variation of the display board, which increases cost and manufacturing complexity. A switching matrix could be adopted to allow each display board to be fit to the hardware; yet these switching mechanisms are had at a cost beyond that of crossover routing. A couple of simple approaches to this problem exist: One simple approach is to use a microcontroller that contains a few bytes of programmable static memory, such as EEPROM, that are under program control. Then during unit test of the electronics module, prior to assembly on a display board, the test fixture enters a mode in which input/output pairs that are to be matched on the display board are put in continuity and the firmware is initially powered up at which time it checks to see if it has already been programmed—if not it would map out the associations to the non-volatile memory and set a flag indicating it had already been programmed. If a microcontroller containing OTP ROM (One Time Programmable Read Only Memory) is price competitive with a factory programmed device, then during system test the assembled electronics module can be programmed and tested just prior to assembly. The module can be manufactured in quantity as it can be used for every type of display board and programmed for the specific instance at the last stage of manufacture.

At block "d" the first pin is selected for output while remaining pins are set for input. Pins that are not being used within the specific display board have already been mapped out and are not involved in the following tests for matches, mismatches, and faults. An input pin corresponding to a match of the output pin is tested at block "e".

If a match exists then a flag is set for this bit at "f", if this is a new match "e" then the match number is incremented "M_Num". User's get varied audio feedback depending as the number of successful matches increases. If all the pairs have then been matched "i", then a win flag "Win_F" is set so that the user may be given special audio recognition for having matched all pairs correctly. The program then proceeds to test for mismatches on the same pin—it is possible that additional pins may be in electrical continuity with the matched pair.

If no match exists at "e" then execution continues directly to test for mismatches at "k". If pins associated with incorrect matches pick up the logic high of the output pin, then a mismatch has occurred, a test made at block "k". Upon mismatch at block "l", a mismatch flag is set for this bit "Match_F", the associated match flag for this pin is cleared as mismatches take precedence over matches—so that a user can not just touch ALL the connection on the front of the display panel simultaneously, and of course the "Win_F" and the "M_Num" flags are cleared because the user is now incorrect.

Testing is then performed for fault bits at block "m". A fault is when the user selects two question terms or two answer terms. For example—in FIG. 1, if the user were to touch the contact nearest the tape measure and the contact nearest the electric drill a fault would be registered; these two terms are a non-sensical user input. Such a connective association is neither a match nor a mismatch and is therefore registered in a unique manner with unique audio feedback. Likewise, if the user selected two text terms this would also be a fault condition. (If many simultaneous contacts are created by the user, then the "most wrong" of those selections is generally interpreted and used as a response; the user can not thereby gain a right answer by shorting a group of connection.) Bits are set for discovered faults at "n".

At this point all tests have been performed with one particular pin being used as output. The next pin is selected for output while all other pins are set for input. At "p", if not all pins have been used then execution branches back to block "c" via connector "A".

If all pins have been tested, then a check is made at "q", to see if the display board is still being used. If no matches, mismatches, or faults have been registered within the previous 3–5 minutes, then the firmware puts the processor into "SLEEP" mode at "s", thereby conserving battery power.

If the display board is still found to be interactive, then the bit settings are checked against the current audio output settings and a new tone setting is begun. Program execution branches back to block "c" via connector "A" where the next testing loop commences.

Sleep mode for this system is not permanent—in fact the microcontroller wakes up every 2–3 seconds at "d", sets itself up for one quick test pass at "u", then branches to block "c" via connector "A" to perform the quick test for activity. If the system is still not in use, then after this quick check the system will return to sleep mode. Use of this sleep mechanism reduces power consumption during periods of inactivity so that the system can be run continuously on very small batteries, without the need of a power switch.

Playing of each tune is controlled by separate subroutines. The least expensive microcontrollers, such as the PIC 16C55 used, do not contain program interrupt capability, thereby all Input/Output is programmed. Every X number of instruction within the program, a tone routine is called, it branches to the correct tune routine that retains its output state from the previous call. If audio is being output then upon each call the output to the audio transducer is updated.

Summary Ramifications And Scope:

The preferred embodiment details a combination of display board, microcontroller, and firmware plus additional elements comprising an inexpensive self-contained interactive electronic display board capable of providing complex audio feedback corresponding to historical selection of correct matches, incorrect matches, and faults, while being low-cost, reliable, and easily manufactured.

Shown in FIG. 1 and described in the text is a match game whereby text is matched with a pictorial; yet a variety of use variations exist: other match games whereby text is related to text, or pictorials to other pictorials, where sentences are completed, or even mazes are "run". The majority of uses in a classroom setting call for one specific question term to match with one specific answer term, yet the firmware can be set to allow a one to many relationship, or a many to one relationship. These multiplicity relations exist for display boards in which users select all members of a certain type, or all types of a certain group.

User interaction with the preferred embodiment is shown as fingertip contact between alternate hands, yet a number of entertaining variations exist. The use of any body parts would provide conduction, although fingertips are generally the more convenient means. A group can use the interactive display board by holding hands, or in some manner making contact with one another, while members of the group make board contact. Also physical items can be used in addition for making contact: for instance connecting a string from one input to another—why does it not register? One user touches one contact and grabs a metal desk leg, whereby another person grabbing another desk leg selects the answer contact.

A number of nearly equivalent variations of this interactive display board can be arrived at quickly without the faculty of inventive creation. A number of variations have already been outlined, one alternate embodiment is depicted in FIG. 4-A and FIG. 4-B, where inexpensive painted-on resistors and side mounted contact pins are used. Variations to a number of design areas are readily conceived.

The electronic module is shown attached directly to the front of the printed material of the display board, whereas a covering or enclosure could be added. The electronics of the preferred embodiment are shown mounted on a single printed circuit board to form a module which facilitates mounting to the display board and eliminates the need for wired connection; yet many equivalent variations exist. Any or all of the electronic elements can be mounted separately to the display board or another structure in separation or in combination and then mounted to the display board.

The design of the preferred embodiment provides for the use of up to 16 user input contacts, which is described above as 8 pairs for this use in a matching game. If one chooses a different microcontroller or links multiple match boards together, one can facilitate larger numbers of user input terms.

Brass brads are used as answer contacts on the front of the printed material of the display board; they are inexpensive and good conductors. Any conductive means brought forth to the front of the display board would provide an answer contact means. The conductive traces could even be on the front of the display panel and covered with a sheet of graphics with cutouts for the contact points. Additionally all or a portion of the graphics and text could be printed with conductive inks creating interactive contact areas in connection with underlying conductive pathway structures.

The electrical connection mechanism between the electronic module and the display board's conductive traces makes use of mechanical connection between a bent over circuit pin and the conductive trace material. Similar connection properties to the mechanical are established with the use of conductive glues, pastes, or solders, while rivets and various mechanical means of fastening plus conduction can be substituted for the bent-over pins.

The electronic module containing the microcontroller, batteries, and additional circuitry can be manufactured with similar result in a wide variety of structures. The structure of the preferred embodiment was chosen for reasons of cost and ease of manufacture. A few of these myriad variations will be described. The preferred embodiment makes us of a pair of resistor networks in FIG. 3-A to provide resistance pull-downs on the input terms while painted on resistors are shown within the alternate embodiment of FIG. 4A. By altering the firmware so that all terms are pulled low before setting for input/output and then monitoring the time required for a term to go high—the circuit can then function without these pull-down resistors. Using pull-downs simplifies the firmware and makes the overall use of the device more reliable. A specific microcontroller and discrete resistors and capacitors are used as the control elements of this preferred reduction to practice, whereas various microcontroller elements could be substituted, and the microcontroller itself could be replaced with programmable array devices, custom circuits, or even discrete devices. The controlling element is shown mounted as a bare integrated circuit die attached to the printed circuit board connected with wire traces and covered by a non-conductive epoxy; the integrated circuit/s may be attached by any current or future attachment means, such as SMD, through-hole, ball-grid-array, or flip-chip. Discrete through hole components, a resistor and capacitor, are shown in the diagrams while surface mount components may be easily substituted.

A piezo-electric transducer is shown for producing audio, yet speakers, buzzers or alternate means of producing sound could be employed. A pair of button cell batteries are shown powering the unit, whereas a single battery, a multiplicity of batteries, an external battery, or a capacitor charged by a solar-cell are all equivalently capable of providing for the energy requirements of the device. The battery contact and retention mechanism of this reduction to practice is formed from bent sheet metal; a variety of battery retention structures can be formed from plastic, metal, or alternate materials in various arrangements and form factors that still retain the power source while providing a conductive pathway. The printed circuit board used herein is formed from phenolic material commonly used in the electronic toy industry due to its low cost and the ease with which holes, knockouts, and shapes may be fabricated. Alternately the printed circuit board could be formed from standard fiber-glass "FR-x" material or a variety of non-conductive materials overlayed with conductive traces.

Program flow for the firmware of this preferred embodiment is described. Numerous variations to this code flow easily written as the flow and design of the firmware depend on the exact electronic control elements chosen and the background plus desires of the programmer.

Features could of course be added to this basic interactive display board, such as flashing lights within the electronic module or at the points of contact. An On/Off switch could be added if the electronics used were incapable of long-term standby use. A volume control in the form of jumpers, switches, or a potentiometer can be added so that the volume can be set according to the environment of its use. Option selection mechanisms in many forms could allow manufacturers or users to select a variety of operating characteristics.

Other variations could be created by eliminating or altering capabilities such as the audio signal characteristics relative to the answer inputs and answer history.

Upon reviewing the invention thus described in the preferred embodiment, additional variations will become obvious to those skilled in the art and without the exercise of inventive faculty. Although the description above contains many speficities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one "unless explicitly so stated, but rather "or more more. "All structural, chemical, and functional equivalents to the elements of the above-described preferred embodiment that are known to those of ordinary skill in the art are expressly incorporated erein by reference and are intended to be encompassed by the present claims. Moreover, it is not necessary for a device or method to address each and every problem sought to be solved by the present invention, for it to encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. An interactive instructional display apparatus, comprising:
   (a) a sheet of printed material;
   (b) a plurality of electrical contacts on the surface of said sheet;
   (c) a plurality of conductive paths attached to said electrical contacts;
   (d) a means for sensing associations between various electrical contact combinations, said means being electrically connected with said conductive paths and capable of registering electrical conduction between any two of the plurality of contacts which are simultaneously touched by a user, or connected users;
   (e) an audio sequence generator which generates audio sequences in response to the pattern of registered associations between contacts; and (f) a power source supplying power to the sensing means and the audio sequence generator.

2. An interactive instructional display apparatus as recited in claim 1, wherein the electrical contacts and the conductive pathways are incapable of establishing an electrical connection with one another as a result of pressure application therebetween, such that pressure applied to the electrical contacts is not registered as a transition from said first state to said second state.

3. An interactive instructional display apparatus as recited in claim 1, wherein external conductive wiring, manipulated by the user, is not required in forming a conductive pathway.

4. An interactive instructional display apparatus as recited in claim 1, wherein the composition of the sheet of printed material is devoid of layers which electrically interact with one another when acted upon by a physical force.

5. An interactive instructional display apparatus as recited in claim 1, wherein the means for sensing associations between various electrical contact combinations through said electrical contacts comprises a circuit capable of sensing current flow through the resistance characteristic of a human body that is touching between any two of the contacts to establish a desired association therebetween.

6. An interactive instructional display apparatus as recited in claim 1, wherein the means for sensing an associations between various electrical contact combinations through said electrical contacts comprises a circuit capable of sensing very low levels of current flow of up to about 500 nA between any two of said contacts upon which the resistance characteristic of a user's body has been interposed.

7. An interactive instructional display apparatus, comprising:

(a) a sheet of printed material;

(b) a plurality of electrical contacts on the surface of said sheet;

(c) a plurality of conductive paths attached to said base member and in electrical contact with said electrical contacts, the electrical characteristics of the plurality of conductive paths combined with the plurality of electrical contacts on said sheet being unresponsive to the application of pressure applied thereon;

(d) a sensing circuit electrically connected to the electrical contacts through the conductive paths and configured to sense high resistance, such as provided by a range of human body resistance of up to approximately ten-megaohms, as a contact state in which the user's body is touching at least any two of the electrical contacts from the plurality of electrical contacts so as to make a desired association between the two contacts;

(e) an audio sequence generator which generates audio sequences in response to the pattern of contact states of said electrical contacts as determined by said sensing circuit; and (f) a power source supplying power to the sensing circuit and the audio sequence generator.

8. An interactive instructional display apparatus as recited in claim 7, wherein the audio sequence generator is comprised of at least one circuit element selected from the group of circuit elements consisting of: microcontrollers, programmable logic, semi-custom integrated circuits, and custom integrated circuits.

9. An interactive instructional display apparatus as recited in claim 8, wherein the audio sequence generator comprises a microcontroller and an audio converter capable of converting electrical signals from the microcontroller into audio.

10. An interactive instructional display apparatus as recited in claim 9, wherein a portion of the input/output pins on said microcontroller are configured for performing the high resistance sensing.

11. An interactive instructional display apparatus as recited in claim 10, wherein the microcontroller under program control is capable of entering a sleep mode, characterized by reduced power dissipation, during periods of inactivity wherein no users are touching the electrical contacts.

12. An interactive instructional display apparatus as recited in claim 10, wherein the microcontroller under program control is responsive to recent user input history and is capable of generating different audio sequences for the same user input depending on prior user inputs.

13. An interactive instructional display apparatus as recited in claim 10, wherein the circuitry of the microcontroller, audio converter, and power source are contained within a module that is mounted to the base member.

14. An interactive instructional display apparatus as recited in claim 7, wherein conductive paint is applied to said sheet of printed material to form the conductive paths.

15. An interactive instructional display apparatus as recited in claim 7, wherein individual conductive terminals comprise said plurality of electrical contacts.

16. An interactive instructional display apparatus as recited in claim 15, wherein the individual conductive terminals comprise brass brads.

17. An interactive instructional display apparatus as recited in claim 7, wherein batteries provide the power source.

18. An interactive instructional display apparatus as recited in claim 7, wherein the number of responses that may be detected by the user touching between a single pair of contacts is at least $n^n$, where n is the number of pairs of contacts.

19. An interactive instructional display apparatus as recited in claim 7, wherein the sensing circuit is capable of determining the number of active contact pairs to be used within the instance of the implemented instructional display apparatus, and thereby detects associations only between the active contact pairs.

20. A method for adding interactive capability to any sized sheet of printed material, as exemplified by a classroom display board, that can thereby register user responses to a problem depicted on the printed material, comprising the steps of:

(a) applying a conductive trace pattern to a backside of the printed material, said conductive pattern not containing any switches between the conductive traces;

(b) applying a plurality of electrical contacts to the printed material which are in electrical connection with the conductive trace pattern and positioned so that they may be reached from the front face of the printed material; and (c) securing an electronic response module to the printed material such that an electrical connection is established with the conductive trace pattern that leads to the electrical contacts, said electronic response module including a power source, a means for sensing electrical contact with a user's body as an association between any two of the contacts from the plurality of contacts, and an audio sequence generator that generates audio sounds in response to the user selected associations of the user's body with the electrical contacts.

* * * * *